Dec. 27, 1932.   T. F. COURTHOPE ET AL   1,892,331
METHOD AND APPARATUS FOR DISSOLVING SALTS
Filed Sept. 9, 1929
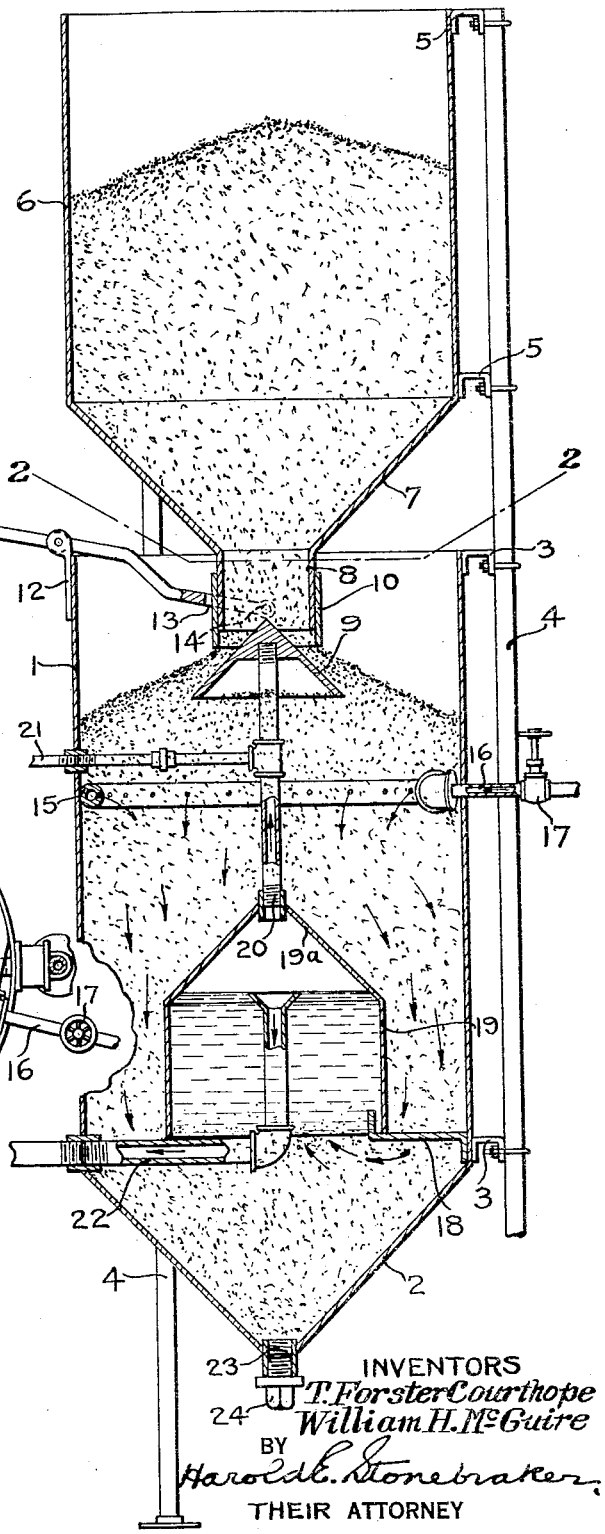
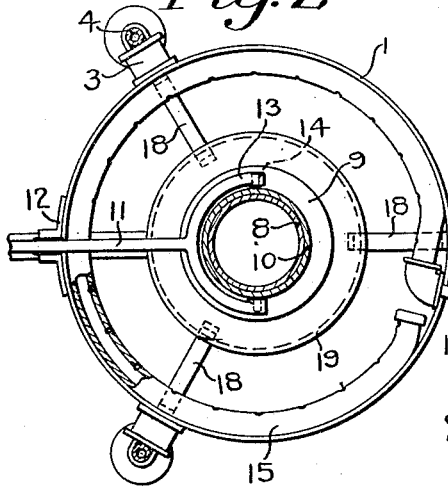
INVENTORS
T. Forster Courthope
William H. McGuire
BY
Harold E. Stonebraker
THEIR ATTORNEY Patented Dec. 27, 1932

1,892,331

UNITED STATES PATENT OFFICE

THOMAS FORSTER COURTHOPE, OF GENESEO, AND WILLIAM H. McGUIRE, OF RETSOF, NEW YORK, ASSIGNORS TO RETSOF MINING COMPANY, OF SCRANTON, PENNSYLVANIA, A CORPORATION OF NEW YORK

METHOD AND APPARATUS FOR DISSOLVING SALTS

Application filed September 9, 1929. Serial No. 391,432.

This invention relates to an improved method and apparatus for dissolving soluble salts or other solid substances.

In the use of salts in various industries, it is often desirable to dissolve large quantities of salts, which are used in solution. In the past, it has been the practice to dissolve these salts in vats or tanks and to hasten the process of solution mechanically by means of agitators or by the application of heat.

In making salt solutions from natural halite or rock salt, it is generally found difficult to obtain a clear solution, due to impurities present in the salt. It is therefore necessary to filter the solution, a rather slow operation, often requiring expensive apparatus.

The principal object of this invention is to provide a method and apparatus for dissolving salts or like substances which is more efficient than previous methods and which does not require mechanical agitation or the application of heat.

A further object of the invention is to provide an improved method of dissolving salts, in which the liquid solvent flows through the mass of salts which is dissolved and the resulting solution clarified by the filtering action of the salts.

Another object of the invention is to provide an apparatus for dissolving salts comprising a vat and means for regulating the flow of both the salts and liquid solvent thereto, to control the degree of concentration of the resulting solution.

To these and other ends, the invention consists in the construction and arrangement of parts that will appear from the following description when read in conjunction with the accompanying drawing, the novel features being pointed out in the claims following the specification.

In the drawing:

Figure 1 is a vertical section of an apparatus for dissolving salts constructed according to one possible embodiment of the invention, and Figure 2 is a plan view of the same, the hopper being sectioned away on line 2—2 of Figure 1.

The embodiment of the invention illustrated in the drawing comprises a vat or tank open at its top, preferably cylindrical in form, and having a bottom of inverted cone shape. The solid salt flows into the top of the vat from a receptacle or hopper, means being provided for controlling the flow of salt and distributing it to the sides of the vat. The liquid solvent is sprayed into salt from a pipe or conduit connected with a source of supply. Arranged centrally in the vat is a solution chamber, preferably cylindrical in form open at its bottom and having a conical top. The fresh supply of salt settles around this chamber as the liquid carries it away in solution, and the solution rises in the chamber from a point near the top of which a discharge outlet is provided.

Referring particularly to the drawing, the apparatus comprises a vat or tank 1, preferably of cylindrical form, open at its top and having a downwardly and inwardly inclined bottom wall forming an inverted cone shaped bottom 2. The vat 1 is carried on brackets 3 secured to upright supports 4. Also secured to the uprights 4 are brackets 5 which carry a hopper or receptacle 6 arranged vertically above the vat 1.

The hopper 6 is also preferably cylindrical in form and has a downwardly and inwardly inclined bottom of inverted conical shape 7, terminating in a downwardly extending tubular portion 8 open at its lower end. The supply of salt to be dissolved is poured into the open top of the hopper and flows under the action of gravity through the extension 8 into the vat 1.

It is desirable to spread the salt or deflect it toward the outer walls of the vat in order that it may be more evenly distributed therein. To this end a deflector 9 of conical shape is arranged centrally in the vat immediately below the mouth of the hopper with its apex projecting therein, so that material discharged from the mouth of the hopper is directed over its surface toward the outer wall of the vat. This cone shaped distributor also serves as part of a controlling mechanism or valve for controlling or regulating the flow of salt from the hopper. To this end, a sleeve 10 is slidably mounted on the member 8 and movable from the position shown in the drawing in which the flow of salt from the hopper is unobstructed thereby to a position in which its lower end rests on the cone shaped member 9, in which position the flow of salt from the hopper is entirely cut off. The sleeve may be held in any desired intermediate position by any suitable means, as by frictional engagement with the tubular extension 8.

Manually operated means are provided for moving the sleeve to desired position. Said means comprises a lever 11, pivoted in a bracket 12 on the vat, and having a forked portion 13 at its inner end adapted to receive projections 14 on opposite sides of the sleeve. It will be noted that the sleeve 10 and cone shaped member 9 cooperate to form a valve operative to control or regulate the flow of salt from the hopper.

Means are also provided for spraying the liquid on the salt in the vat in substantially uniform distribution. To this end, a perforated conductor or pipe 15 in the form of a coil is arranged in the vat near its top and is connected with a source of liquid supply through a pipe or conductor 16. A hand operated valve 17 may be provided in the conductor for controlling the supply of liquid to the vat.

Arranged centrally within the vat adjacent its bottom and supported on brackets 18 is a solution chamber or settling tank 19, preferably cylindrical in form, open at its lower end and having a cone shaped top 19ª adapted to direct the salt and liquid in the vat over and around its sides. Liquid passing through the mass of salt contained in the vat and carrying an increasing amount of the salt in solution rises in the vat and in the chamber 19. In order to facilitate the flow of liquid or solution to and from said chamber, an air vent 20 may be connected with the top of the chamber and arranged to communicate with the atmosphere at any convenient point, as at 21.

In order that insoluble impurities carried in the solution may settle therefrom before the solution is delivered or discharged from the vat, it is desirable to discharge the solution from a point above the bottom of the chamber. For this purpose, an L-shaped pipe or conductor 22 has one arm extending vertically in the chamber to a point adjacent its top and the other arm extending laterally through the wall of the vat, so that the solution may be delivered to a point outside.

It will be noted that the apparatus was designed more particularly for converting halite or salt into brine. The phenomenon of solution takes place most rapidly near the top of the vat where the solvent first contacts the salt. As the solution descends through the mass of salt below, its concentration increases and the mass of salt itself serves to filter the solution, and any insoluble matter remaining in the solution is deposited in the bottom of the vat when the solution comes to substantial rest in the chamber 19, and the solution delivered from the apparatus is clear and free from solid impurities. The insoluble impurities contained in the salt collect in the conical bottom of the vat, the apex of which may be provided with a discharge opening 23 through which the insoluble matter may be discharged. Normally said discharge opening may be closed by any suitable means, as a plug 24.

While only one embodiment of the invention is shown and described herein, it will be understood that this application is intended to cover such changes or modifications as may come within the intent or scope of the appended claims, and while described particularly with reference to dissolving common salt, it will be understood that the invention may be useful in dissolving other soluble salts or substances in water or other liquids, such as acids or alkalies.

We claim:

1. A salt dissolving apparatus comprising a vat for solid material to be dissolved, said vat having a closed bottom and an open top, a solution-receiving chamber in said vat having an open bottom and a closed top, said chamber being separate from the inner wall of the vat and arranged above its bottom, means for introducing a solvent into the vat at a point above said chamber, and an outlet for the solution in said chamber arranged at a point adjacent the top of the chamber and determining the highest level of the solution in the chamber.

2. A salt dissolving apparatus comprising a vat for solid material to be dissolved, said vat having a closed bottom and an open top, a solution-receiving chamber in said vat having a cone-shaped top and an open bottom and supported in the vat in spaced relation to its inner wall and with its bottom above and separated from the bottom of the vat, an air vent in the top of said chamber to permit the escape of air therefrom when the solution rises therein, means for introducing a solvent into the vat at a point above said chamber, and an outlet in and above the bottom of said chamber for discharging solution therefrom.

3. A salt dissolving apparatus comprising a vat for solid material to be dissolved, said vat having an open top and a closed bottom, means for introducing solid material into said vat, a solution receiving chamber in said vat, said chamber being supported above the bottom of the vat and separate from its inner wall and having its top arranged below the normal surface level of the soluble material in the vat and an opening in its bottom, means for introducing a solvent into the vat at a point above the solution chamber and below the normal surface level of the soluble material in the vat, and an outlet above the bottom of said chamber for discharging solution therefrom, the arrangement being such that the solvent is introduced directly into the solid soluble material and flows downwardly through the same around the solution chamber and into the chamber through its open bottom.

4. A salt dissolving apparatus comprising a vat for solid material to be dissolved, said vat having an open top and an inwardly and downwardly inclined bottom for directing material toward a centrally arranged opening therein, a solution-receiving chamber in said vat spaced inwardly from the wall of the vat and having a closed top and an open bottom spaced from the bottom of the vat and over the opening therein, means for introducing a solvent into the vat at a point above the solution chamber, an outlet in said chamber above its bottom for discharging solution therefrom, and removable means for closing the opening in the bottom of the vat, the arrangement being such that insoluble impurities in the soluble material collect in the bottom of the vat and are discharged through the opening therein when its closing means is removed.

5. A salt dissolving apparatus comprising a vat for solid material to be dissolved, said vat having an open top and a closed bottom, a solution chamber in said vat having a closed top and an open bottom, said chamber being separate from and spaced above the bottom of the vat and below the top of the vat and having its outer wall spaced from the inner wall of the vat, means for introducing solid material into the top of the vat and onto the top of the chamber and between the outer wall of the chamber and inner wall of the vat and onto the bottom of the vat beneath the chamber, a coil in the vat above the chamber for introducing a solvent into the soluble material at a point above the chamber and between the chamber and the inner wall of the vat, and means for discharging the solution from the chamber.

6. An apparatus for dissolving salt comprising a vat for the salt to be dissolved, means for introducing a solvent at a point adjacent the top of the vat, a solution chamber in the vat arranged below the solvent introducing means and having a bottom opening into the vat and a closed top, said chamber being spaced from the inner wall of the vat to provide a passage for the salt and its solution, an air vent connected with the top of said chamber, and means for discharging the solution from said chamber from a point above its open bottom.

7. A salt dissolving apparatus comprising a vat for solid material to be dissolved, said vat having an open top and a closed bottom, means for discharging solid material centrally into said vat, a solution-receiving chamber arranged centrally in said vat and spaced inwardly from the wall of the vat, said chamber being arranged above the bottom of the vat and having an open bottom and a closed top inclined downwardly and outwardly from its center to direct the solid material to the space between the chamber and the wall of the vat, means for introducing a solvent into the vat at a point above the solution chamber, and an outlet for discharging the solution from the chamber from a point adjacent its top.

In witness whereof, we have hereunto signed our names.

T. FORSTER COURTHOPE.
WILLIAM H. McGUIRE.